US012672099B2

(12) United States Patent
Murayama et al.

(10) Patent No.: US 12,672,099 B2
(45) Date of Patent: Jun. 30, 2026

(54) CONTROL APPARATUS, CONTROL METHOD AND PROGRAM FOR CONTROLLING POSITIONS OF BASE STATION AND TERMINAL

(71) Applicant: NTT, Inc., Tokyo (JP)

(72) Inventors: Daisuke Murayama, Tokyo (JP); Shota Nakayama, Tokyo (JP)

(73) Assignee: NTT, Inc., Tokyo (JP)

( * ) Notice: Subject to any disclaimer, the term of this patent is extended or adjusted under 35 U.S.C. 154(b) by 330 days.

(21) Appl. No.: 18/560,545

(22) PCT Filed: Jun. 21, 2021

(86) PCT No.: PCT/JP2021/023339
§ 371 (c)(1),
(2) Date: Nov. 13, 2023

(87) PCT Pub. No.: WO2022/269666
PCT Pub. Date: Dec. 29, 2022

(65) Prior Publication Data
US 2024/0259993 A1 Aug. 1, 2024

(51) Int. Cl.
*H04W 64/00* (2009.01)
*H04N 7/18* (2006.01)
(Continued)

(52) U.S. Cl.
CPC .......... *H04W 64/006* (2013.01); *H04N 7/183* (2013.01); *H04W 84/005* (2013.01)

(58) Field of Classification Search
CPC ... H04W 64/006; H04W 84/005; H04N 7/183
(Continued)

(56) References Cited

U.S. PATENT DOCUMENTS 7,299,069 B2 * 11/2007 Claussen ............... H04W 16/18
455/90.3
2002/0049064 A1 * 4/2002 Banno ...................... G01S 5/12
455/457
(Continued)

FOREIGN PATENT DOCUMENTS

JP        2019-161464        9/2019
JP        2020-107955        7/2020

OTHER PUBLICATIONS

Yoshihisa Kishiyama et al., 5G Outdoor Experiment for Ultra-High Speed and Long Distance Transmission Using Millimeter Waves, NTT Docomo Technical Journal, © 2018 NTT Docomo, Inc., Japan, (vol. 26-1, p. 25-32), Apr. 2018.

*Primary Examiner* — Mark G. Pannell
(74) *Attorney, Agent, or Firm* — IPUSA, PLLC

(57)        ABSTRACT

A control apparatus for controlling a position and a direction of a base station, and a position of a specific terminal that wirelessly communicates with the base station in conjunction with each other, the control apparatus including: a shield detection information acquisition unit which acquires information obtained by detecting the shield; a specific terminal position candidate calculating unit which calculates a position candidate of the specific terminal on the basis of information obtained by detecting the shield; a line-of-sight determination unit which determines whether there is line-of-sight of the specific terminal from the base station for each of the position candidates of the specific terminal; and a base station movement control parameter calculating unit which determines a position of the specific terminal on the basis of a result of determination of the presence or absence of the line-of-sight and calculates a parameter indicating a position and a direction of the base station.

9 Claims, 9 Drawing Sheets

(51) Int. Cl.
*H04W 16/24* (2009.01)
*H04W 84/00* (2009.01)

(58) Field of Classification Search
USPC .......................................................... 455/456.1
See application file for complete search history.

(56) References Cited

U.S. PATENT DOCUMENTS

| | | | |
|---|---|---|---|
| 2004/0235484 A1* | 11/2004 | Korpela | H04W 24/02 |
| | | | 455/446 |
| 2011/0102256 A1* | 5/2011 | Shen | G01S 19/246 |
| | | | 342/357.31 |
| 2013/0116908 A1* | 5/2013 | Oh | G05D 1/0295 |
| | | | 701/96 |
| 2014/0153773 A1* | 6/2014 | Gupta | G06T 7/75 |
| | | | 382/103 |
| 2014/0378135 A1* | 12/2014 | Koide | H04W 36/12 |
| | | | 455/436 |
| 2016/0380743 A1* | 12/2016 | Rakib | H04B 7/0413 |
| | | | 455/418 |
| 2019/0150001 A1* | 5/2019 | Jen | H04L 43/16 |
| | | | 455/446 |
| 2020/0252838 A1* | 8/2020 | Akdeniz | H04W 36/0061 |
| 2020/0359173 A1* | 11/2020 | Narra | H04W 4/029 |
| 2021/0216085 A1* | 7/2021 | Wake | G05D 1/102 |
| 2021/0368355 A1* | 11/2021 | Liu | H04W 16/18 |
| 2022/0060906 A1 | 2/2022 | Goto et al. | |
| 2022/0264257 A1* | 8/2022 | Hofmann | G01S 5/0249 |
| 2024/0267139 A1* | 8/2024 | Lin | H04W 16/26 |

* cited by examiner

CONTROL APPARATUS, CONTROL METHOD AND PROGRAM FOR CONTROLLING POSITIONS OF BASE STATION AND TERMINAL

TECHNICAL FIELD

The present invention relates to a control apparatus, a control method, and a program.

BACKGROUND ART

As radio communication systems such as 5G, especially, a communication system using a frequency with high straightness such as Above-6 GHz has been developed. For example, NPL 1 discloses outdoor experimental results of 28 and 39 GHz. FR2 may use a wide band, and if a radio wave quality is good, an ultra-high-speed communication can be realized.

CITATION LIST

Non Patent Literature

NPL 1: Yoshihisa Kishiyama, et al., "5G Outdoor Experiment For Ultra-High Speed And Long Distance Transmission Using Millimeter Waves", NTT DOCOMO Technical Journal Vol. 26, No. 1, P25-32, April 2018

SUMMARY OF INVENTION

Technical Problem

There is a demand for always maintaining a good communication state for a specific terminal such as a monitoring camera that uploads high-definition video using a communication system. However, in the related art, because a radio signal in a frequency band called Above-6 such as a 28 GHz band usable in 5 G, local 5 G or the like has high straightness and a large loss due to shielding, there are problems of many shields, and difficulty in maintaining a good communication state in a private environment in which the shields move.

An object of the disclosed technique is to maintain an excellent communication state in a specific terminal even in an environment in which a shield moves.

Solution to Problem

A technology of the present disclosure is a control apparatus for controlling a position and a direction of a base station, and a position of a specific terminal that wirelessly communicates with the base station in conjunction with each other, the control apparatus including: a shield detection information acquisition unit which acquires information obtained by detecting the shield; a specific terminal position candidate calculating unit which calculates a position candidate of the specific terminal on the basis of information obtained by detecting the shield; a line-of-sight determination unit which determines whether there is line-of-sight of the specific terminal from the base station for each of the position candidates of the specific terminal; and a base station movement control parameter calculating unit which determines a position of the specific terminal on the basis of a result of determination of the presence or absence of the line-of-sight and calculates a parameter indicating a position and a direction of the base station.

Advantageous Effects of Invention

Thus, even in an environment in which the shield moves, the specific terminal can maintain a good communication state.

DESCRIPTION OF EMBODIMENTS

Hereinafter, an embodiment (present example) of the present invention will be described with reference to the accompanying drawings. The embodiment described below is a mere example, and embodiments in which the present invention is applied are not limited to the following embodiment.

Outline of the Present Example

A radio communication device according to the present example determines presence or absence of a line-of-sight from each base station of a plurality of position candidates of a monitoring camera on the basis of a shield map based on information of detecting a shield, and determines a combination for maximizing a monitoring area (the size of a monitoring area) by the monitoring camera and a cover area quality of the base station, among the position and direction of the line-of-sight base station and the position of the monitoring camera.

(Configuration Example of Radio Communication Device)

Figure 1:
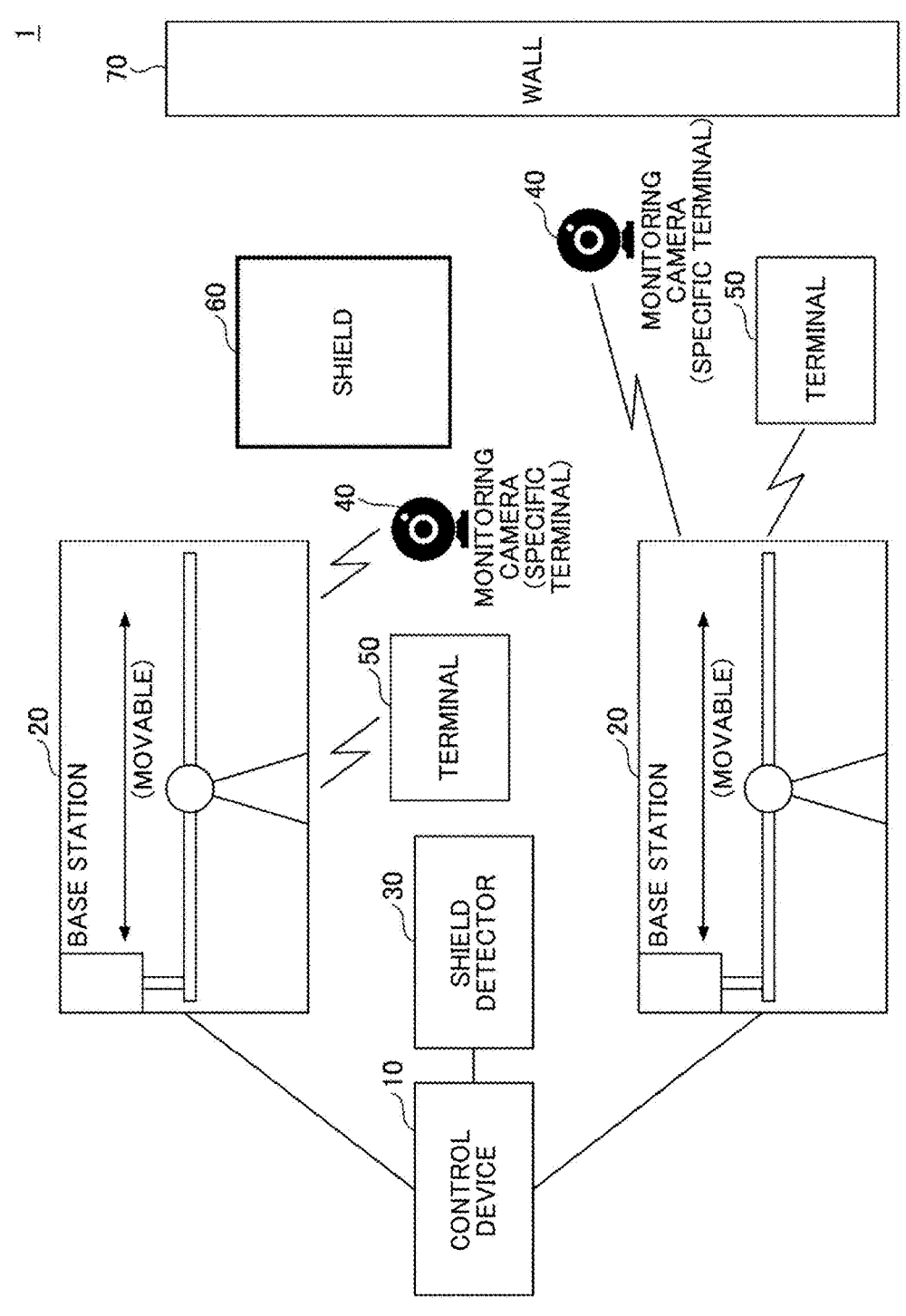
FIG. 1 is a diagram showing a system configuration example of a radio communication system.

FIG. 1 is a diagram showing a system configuration example of a radio communication device. The radio communication device 1 includes a control device 10 (control apparatus), a base station 20, a shield detector 30, a monitoring camera 40, and a terminal 50. A communication area of the radio communication device 1 is an area to be monitored by the monitoring camera 40, and includes a shield 60, a wall 70, and the like.

The control device 10 is communicably connected to the base station 20 and the shield detector 30 by wire or wirelessly. The control device 10 acquires information detected by the shield detector 30 to generate a shield map, determines a position and a direction of the base station 20, and controls the base station 20.

The base station 20 is a base station for radio communication. The base station 20 is a movable base station capable of receiving control by the control device 10 to change the position and direction. A movable range of the base station 20 may be a sliding one-dimensional movable range, or a two-dimensional movable range of a type in which the base station is mounted on a drone, an automated guided vehicle (AGV) or the like.

The shield detector 30 is a camera, a light detection and ranging (LiDAR) system, or the like, and transmits information obtained by detecting the shield to the control device 10.

The monitoring camera 40 transmits a high-definition video obtained by photographing an area to be monitored to the base station 20 by radio communication. The monitoring camera is an example of a specific terminal which should maintain a good communication state with the base station 20, and may be other. For example, the specific terminal may be a repeater for relaying radio communication.

The terminal 50 is a terminal that uses radio communication with the base station 20.

Example 1 and Example 2 will be described below, as an example of a present example.
(Functional Configuration Example of Each Device According to Example 1)

Figure 2:
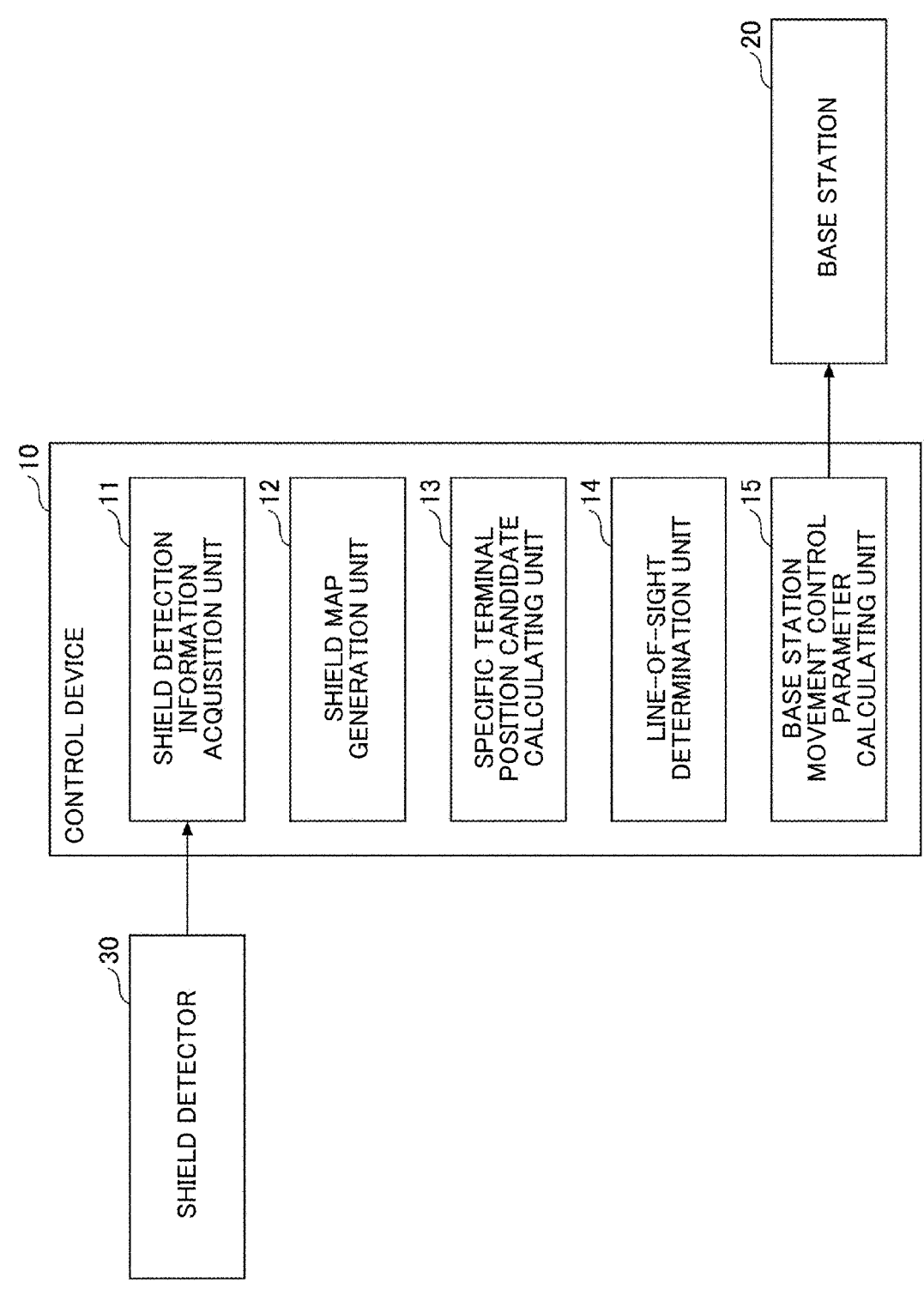
FIG. 2 is a diagram showing a functional configuration example of the control device according to Example 1.

FIG. 2 is a diagram showing a functional configuration example of the control device 10 according to the present example. The control device 10 includes a shield detection information acquisition unit 11, a shield map generation unit 12, a specific terminal position candidate calculating unit 13, a line-of-sight determination unit 14, and a base station movement control parameter calculating unit 15.

The shield detection information acquisition unit 11 acquires information obtained by detecting the shield, by receiving the information from the shield detector 30.

The shield map generation unit 12 generates a shield map indicating the position and size of the shield in the communication area on the basis of information obtained by detecting the shield. The shield map may be either 3D or 2D. When the shield map is 3D, the line-of-sight determination unit 14 determines line-of-sight in consideration of the height.

A specific terminal position candidate calculating unit 13 calculates a position candidate of the monitoring camera 40. The position candidate of the monitoring camera 40 is a position candidate capable of monitoring the area to be monitored depending on the position and size of the shield. An example of the method for calculating position candidates will be described below.

The line-of-sight determination unit 14 determines presence or absence of line-of-sight of the monitoring camera 40 from the base station 20 for each position candidate of the monitoring camera 40. When there are a plurality of base stations 20, the line-of-sight determination unit 14 determines that there is line-of-sight if there is line-of-sight to any of the base stations 20. A specific example of A specific example of determining presence or absence of line-of-sight will be described below.

The base station movement control parameter calculating unit 15 calculates a parameter for movement control of the base station 20. The calculated parameter is specifically a parameter indicating the position and direction of the base station 20.

The control device 10 performs movement control of the base station 20 on the basis of the calculated parameter. The base station 20 may not be of a movable type. In this case, the control device 10 outputs information indicating the calculation result. A user may install the base station 20 on the basis of the calculated result. When there are a plurality of base stations 20, these controls may be combined. For example, the plurality of base stations may be partially movable and partially fixed.
(Operation Example of Radio Communication System)

Next, an operation example of the radio communication device 1 will be described referring to the drawings. When detected by the shield detector 30, the control device 10 starts control processing.

Figure 3:
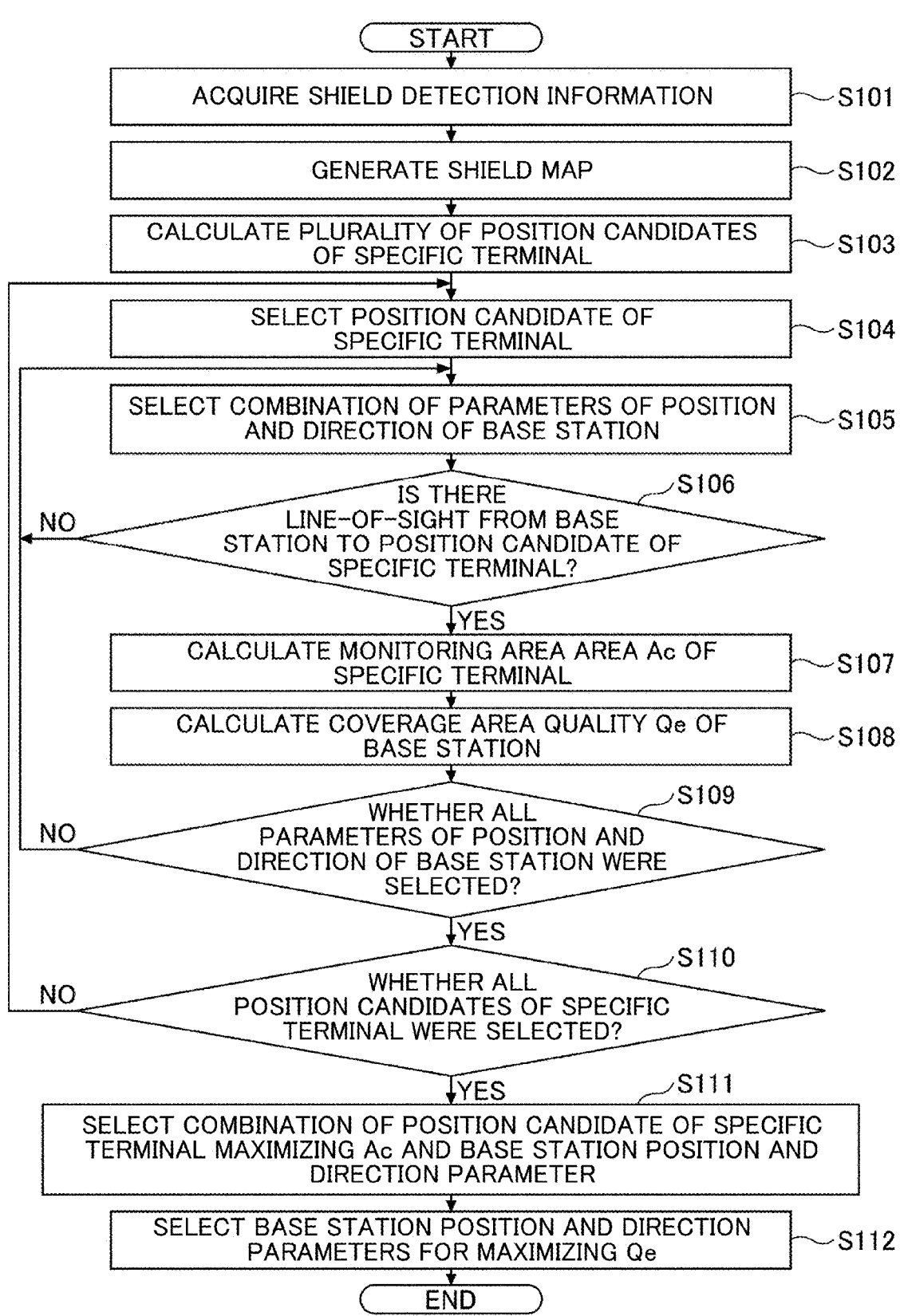
FIG. 3 is a flowchart showing an example of a flow of control processing.

FIG. 3 is a flow chart showing an example of the flow of the control processing. The shield detection information acquisition unit 11 acquires information (shield detection information) obtained by detecting the shield (step S101). Next, the shield map generation unit 12 generates a shield map on the basis of the shield detection information (step S102).

The specific terminal position candidate calculating unit 13 calculates a plurality of position candidates of the monitoring camera 40 (specific terminal) (step S103). Then, the base station movement control parameter calculating unit 15 selects a position candidate of the monitoring camera 40 (specific terminal) (step S104).

Subsequently, the base station movement control parameter calculating unit 15 selects a combination of parameters of the position and direction of the base station (step S105). Specifically, the base station movement control parameter calculating unit 15 stores information indicating a range of values that can be taken as parameters of the position and direction of the base station in advance, and selects one of a plurality of combinations within the range.

Next, the line-of-sight determination unit 14 determines whether there is line-of-sight from the base station 20 to the position candidate of the monitoring camera 40 (specific terminal) on the basis of the selected parameter and the position candidate (step S106). When the line-of-sight determination unit 14 determines that there is no line-of-sight (step S106: No), the process returns to the processing of the step S105, and the base station movement control parameter calculating unit 15 selects a combination different from the combination already selected as a combination of parameters of the position and direction of the base station 20.

When the line-of-sight determination unit 14 determines that line-of-sight exists (step S106: Yes), the base station movement control parameter calculating unit 15 calculates a monitoring area Ac (the size of the monitoring area) of the monitoring camera 40 (specific terminal) (step S107). When the specific terminal is a repeater, the base station movement control parameter calculating unit 15 may calculate the cover area of the repeater as Ac.

Subsequently, the base station movement control parameter calculating unit 15 calculates a cover area quality Qe of the base station 20 (step S108). The control device 10 stores the calculated Ac and Qe. Then, the control device 10 determines whether all parameters of the position and direction of the base station 20 are selected (step S109). When the control device 10 determines that any of the parameters of the position and direction of the base station 20 is not selected (step S109: No), the process returns to processing of the step S105, and the base station movement control parameter calculating unit 15 selects a combination different from the combination already selected as the combination of the parameters of the position and direction of the base station 20.

When determining that all the parameters of the position and direction of the base station 20 are selected (step S109: Yes), the control device 10 determines whether all the position candidates of the monitoring camera 40 (specific terminal) are selected (step S110).

When the control device 10 determines that any of the position candidates of the monitoring camera 40 (specific terminal) is not selected (step S110: No), the process returns to the processing of the step S104, and the base station movement control parameter calculating unit 15 selects a position candidate different from the position candidate already selected as the position candidate of the monitoring camera 40 (specific terminal).

When the control device 10 determines that all the position candidates of the monitoring camera 40 (specific terminal) are selected (step S110: Yes), the base station movement control parameter calculating unit 15 selects a combination of the position candidates of the monitoring camera 40 (specific terminal) that maximizes Ac and the position and direction parameters of the base station 20 (step S111). Further, the base station movement control parameter calculating unit 15 selects the position and direction parameters of the base station 20 that maximizes Qe from the combination of the position and direction parameters of the selected base station 20 (step S112).

(Method for Calculating Position Candidate of Specific Terminal)

Next, a method for calculating the position candidate of the monitoring camera 40 (specific terminal) in the step S103 of the control processing will be described.

A first calculation method is a method for discriminating an element of an area to be monitored which can be seen through from a position candidate of each monitoring camera 40 (specific terminal) on the basis of the shield map. In this method, the specific terminal position candidate calculating unit 13 calculates a position candidate to maximize the number of elements of the area to be monitored within line-of-sight (or the elements of all the area to be monitored are within line-of-sight). Here, a distance limit may be provided for the determination of the presence or absence of the shield.

According to the first calculation method, it is possible to calculate all candidate positions of the monitoring camera 40 that maximize the number of elements that can be monitored, by determining the presence or absence of line-of-sight. Further, when the distance limit is taken into consideration in the line-of-sight condition, more reliable monitoring can be performed in consideration of the limitation of the camera resolution or the like. When the specific terminal is a repeater, the number of elements which can be relayed may be used instead of the number of elements which can be monitored.

Figure 4:
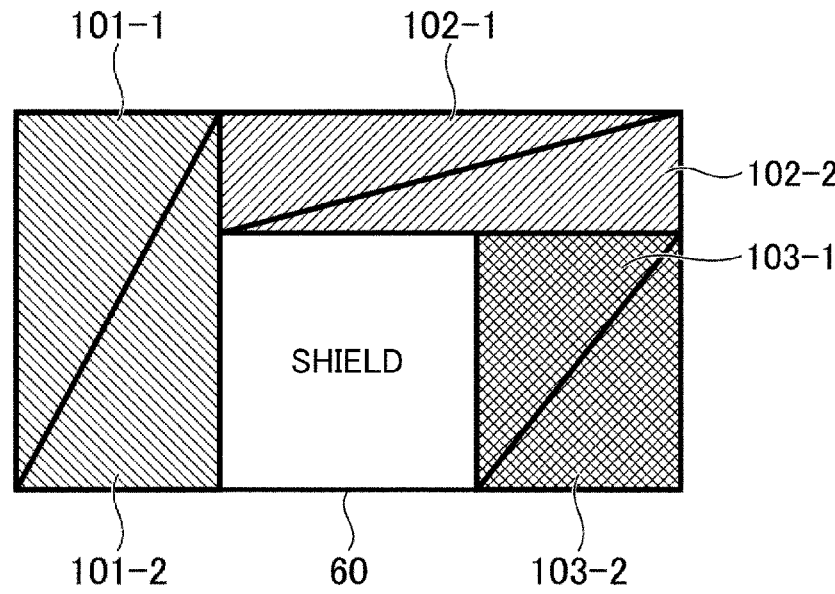
FIG. 4 is a diagram for explaining an example of a method for calculating position candidates of a specific terminal.

FIG. 4 is a diagram for explaining an example of a method for calculating position candidates of a specific terminal. In a second calculation method, the specific terminal position candidate calculating unit 13 divides the area to be monitored into a plurality of triangles as shown in the triangle 101-1 shown in FIG. 4.

Then, the specific terminal position candidate calculating unit 13 combines triangles that can be combined (triangles that share two vertices, for example, a triangle 101-1 and a triangle 101-2, a triangle 102-1 and a triangle 102-2, and a triangle 103-1 and a triangle 103-2).

Further, the specific terminal position candidate calculating unit 13 takes the area covered by the combined triangles as a position candidate for placing one monitoring camera 40.

According to the second calculation method, the position candidate of each monitoring camera 40 (specific terminal) can be calculated by a simpler calculation method.

(Method for Determining Line-of-Sight)

Next, a method for determining the line-of-sight in step S106 of the control processing will be described.

Figure 5:
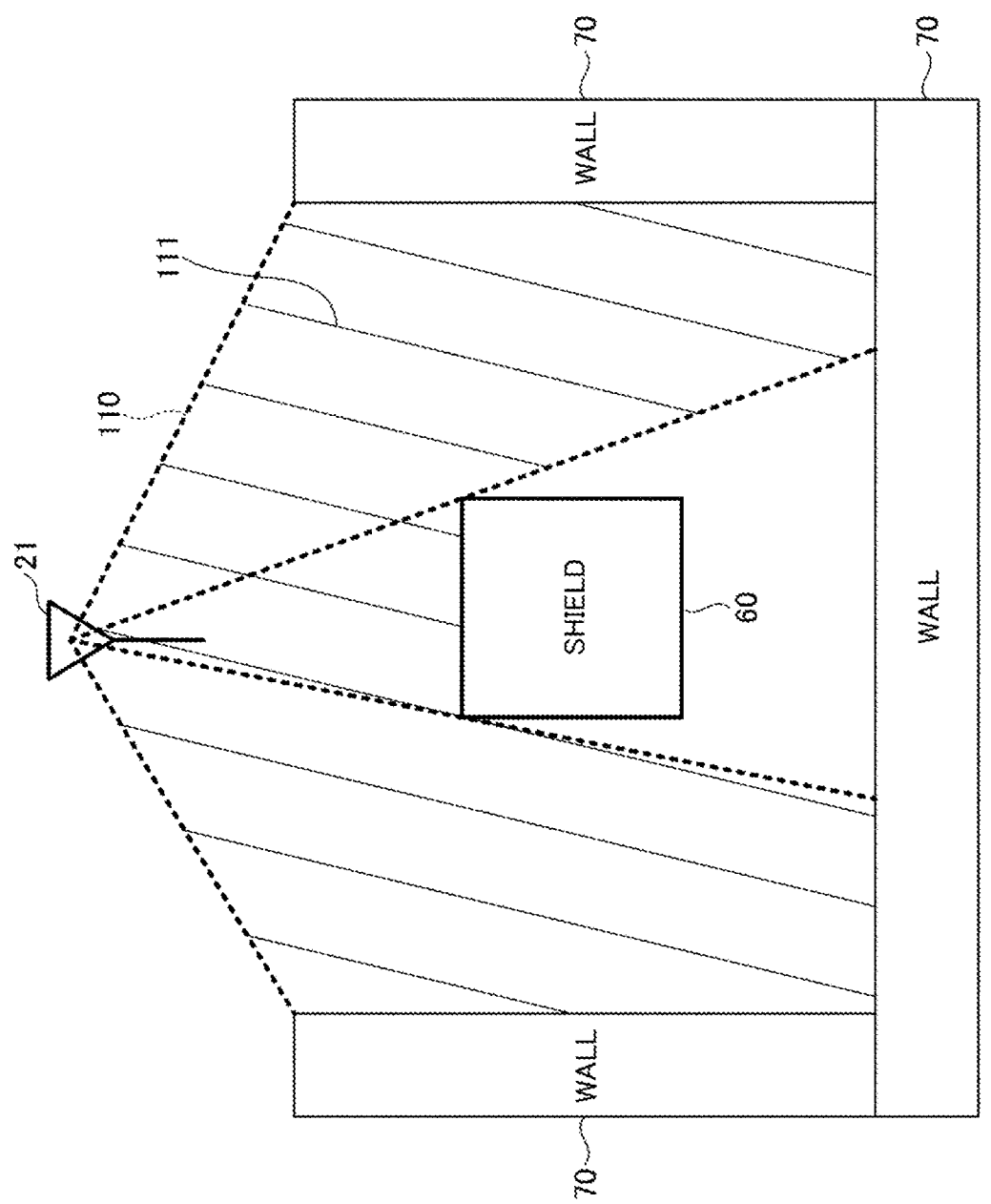
FIG. 5 is a first diagram for explaining an example of a method for determining line-of-sight according to the Example 1.

FIG. 5 is a first diagram for explaining an example of a method for determining line-of-sight according to the first embodiment. In the first method for determining line-of-sight, the line-of-sight determination unit 14 defines a region 111 through which a line segment 110 passes from a point at the center of the antenna 21 of the base station 20 until it collides with the wall 70 or the shield 60, as the line-of-sight area.

According to the first method for determining line-of-sight, an area within the line-of-sight can be easily calculated only by the area shape and the position and the shape of the shield, regardless of the position of the monitoring camera 40 (specific terminal).

Figure 6:
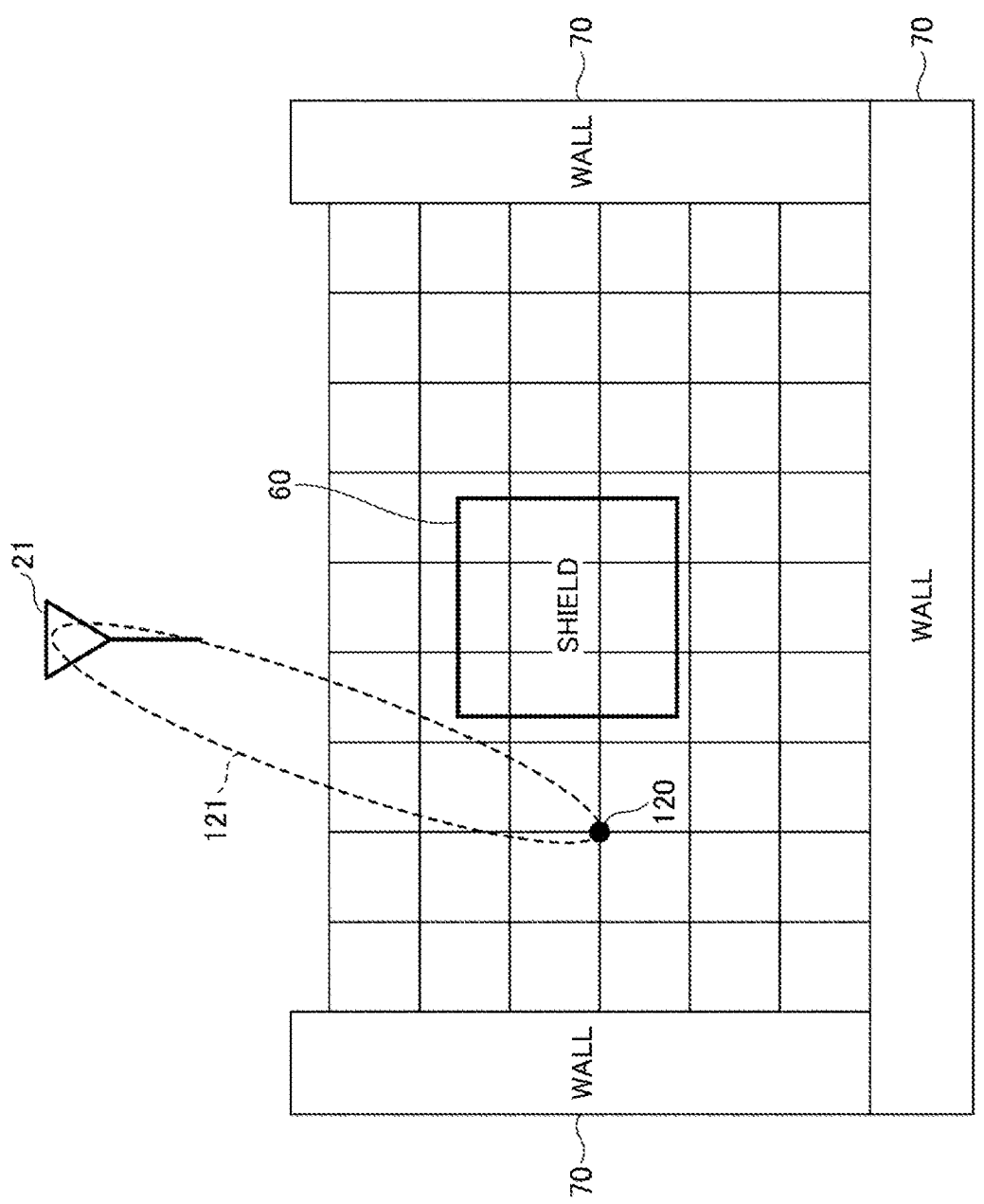
FIG. 6 is a second diagram for explaining an example of the method for determining line-of-sight according to the Example 1.

FIG. 6 is a second diagram for explaining an example of the method for determining line-of-sight according to the first embodiment. In a second method for determining line-of-sight, the line-of-sight determination unit 14 calculates a Fresnel zone 121 for each point 120 on a predetermined grid from a point at a center position of the antenna 21 of the base station 20. Then, the line-of-sight determination unit 14 sets a point on which predetermined X % of the Fresnel zone 121 is not shielded as a position within the line-of-sight, and sets an area around the point as an area within the line-of-sight.

According to the second method for determining line-of-sight, in the same manner as the first method for determining line-of-sight, an area within the line-of-sight can be easily calculated only by the area shape and the position and the shape of the shield regardless of the position of the monitoring camera 40 (specific terminal), and a determination result closer to an actual communication state than the first method for determining line-of-sight can be obtained.

An example of the Fresnel zone calculation method is as follows. When the shortest distance between a transmission side and a reception side is defined as d (m), a radius (Fresnel radius) of the central part of the spheroid is defined as r1 (m), a distance between the transmission side and the center of the spheroid is defined as d1 (m), a distance between the reception side and the center of the spheroid is defined as d2 (m), a path difference between the reflected wave reflected at the Fresnel radius portion and the direct wave is defined as d3 (m), and a wavelength is defined as $\lambda$(m), d3 (m) and r1 (m) are calculated by the following expression.

$$d3 = \sqrt{d1^2 + r1^2} + \sqrt{d2^2 + r1^2} - d = \frac{\lambda}{2} \text{ and} \quad \text{[Math. 1]}$$

$$r1(m) = \sqrt{\lambda \frac{d1d2}{d1 + d2}} = \frac{\sqrt{\lambda d}}{2} \quad \text{[Math. 2]}$$

Example 2

Example 2 will be described below with reference to the drawings. The Example 2 differs from the Example 1 in that the position information of the specific terminal is used for the determination of line-of-sight and the specific terminal detects a shield. In the following description of the Example 2, the differences from the Example 1 will be mainly described, and the same reference numerals as those used in the description of the Example 1 are given to those having the same functional structure as that of the Example 1, and the description thereof will not be provided.

(Functional Configuration Example of Each Device According to Example 2)

Figure 7:
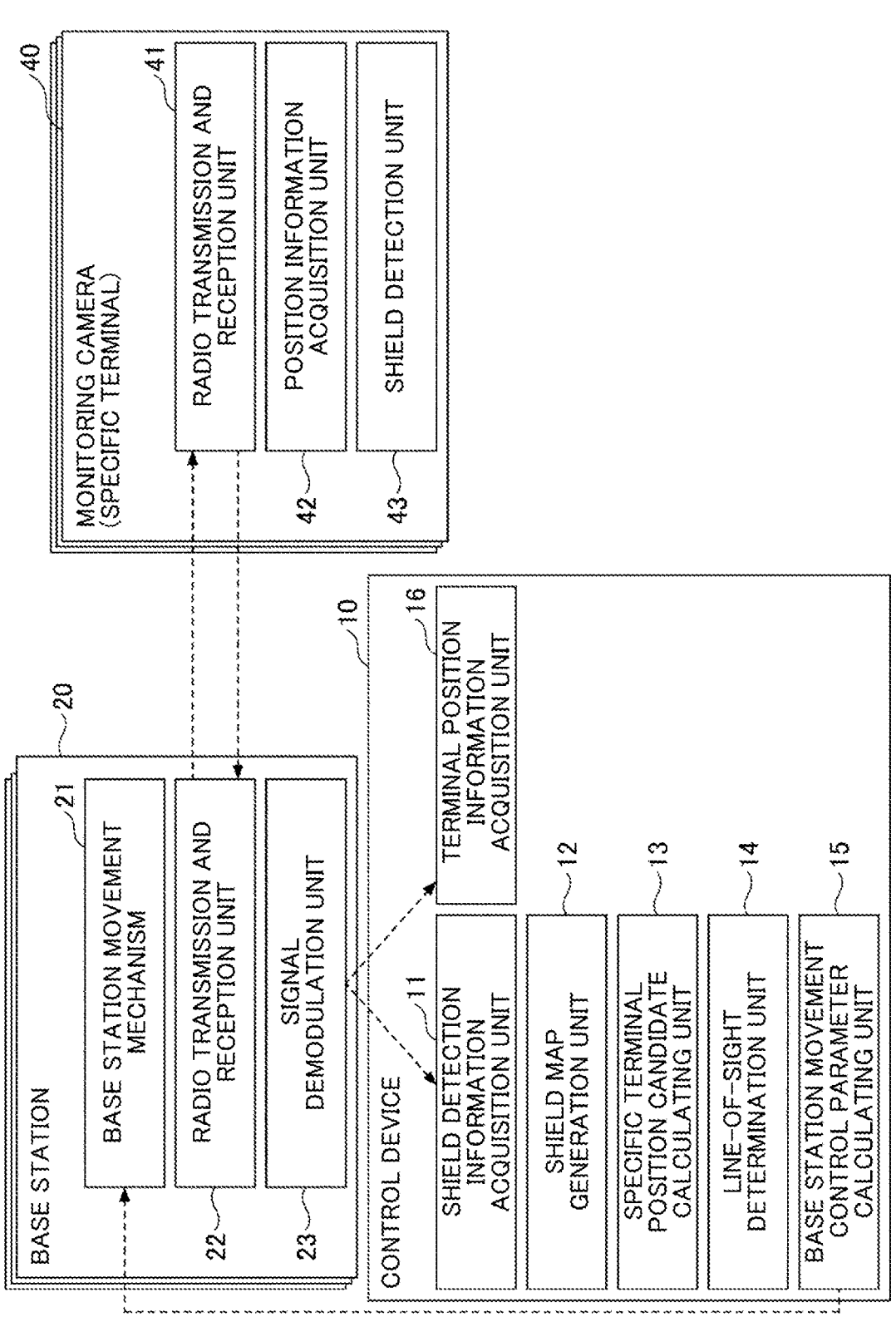
FIG. 7 is a diagram showing an example of the functional configuration of each device according to Example 2.

FIG. 7 is a diagram showing an example of the functional configuration of each device according to the Example 2. The control device 10 according to the present example has a configuration in which the terminal position information acquisition unit 16 is added to the control device 10 according to the Example 1.

The terminal position information acquisition unit 16 acquires terminal position information indicating a position of a specific terminal from the base station 20.

The base station 20 includes a base station movement mechanism 21, a radio transmission and reception unit 22, and a signal demodulating unit 23. The base station movement mechanism 21 is a mechanism (actuator) which receives the control of the control device 10 to move the base station.

The radio transmission and reception unit 22 transmits and receives a signal of radio communication with the monitoring camera 40 (specific terminal). Specifically, the radio transmission and reception unit 22 receives terminal position information and shield detection information obtained by detecting a shield from the monitoring camera 40 (specific terminal).

Instead of receiving the terminal position information, the base station 20 may estimate the position of the monitoring camera 40 (specific terminal), using a camera image or the like.

The signal demodulating unit 23 demodulates the radio signal received by the radio transmission and reception unit 22. The base station 20 transmits the demodulated signal to the control device 10.

The monitoring camera 40 (specific terminal) includes a radio transmission and reception unit 41, a position information acquisition unit 42, and a shield detection unit 43.

The radio transmission and reception unit 41 transmits and receives a signal of radio communication with the base station 20. Specifically, the radio transmission and reception unit 41 transmits the terminal position information and the shield detection information to the base station 20.

The position information acquisition unit 42 acquires position information by specifying its own position by global positioning system (GPS) or sensing.

The shield detection unit 43 detects a shield by a camera or a Lidar or the like, and acquires shield detection information.

(Method for Determining Line-of-Sight According to Example 2)

Next, a method for determining line-of-sight according to the present example will be described.

Figure 8:
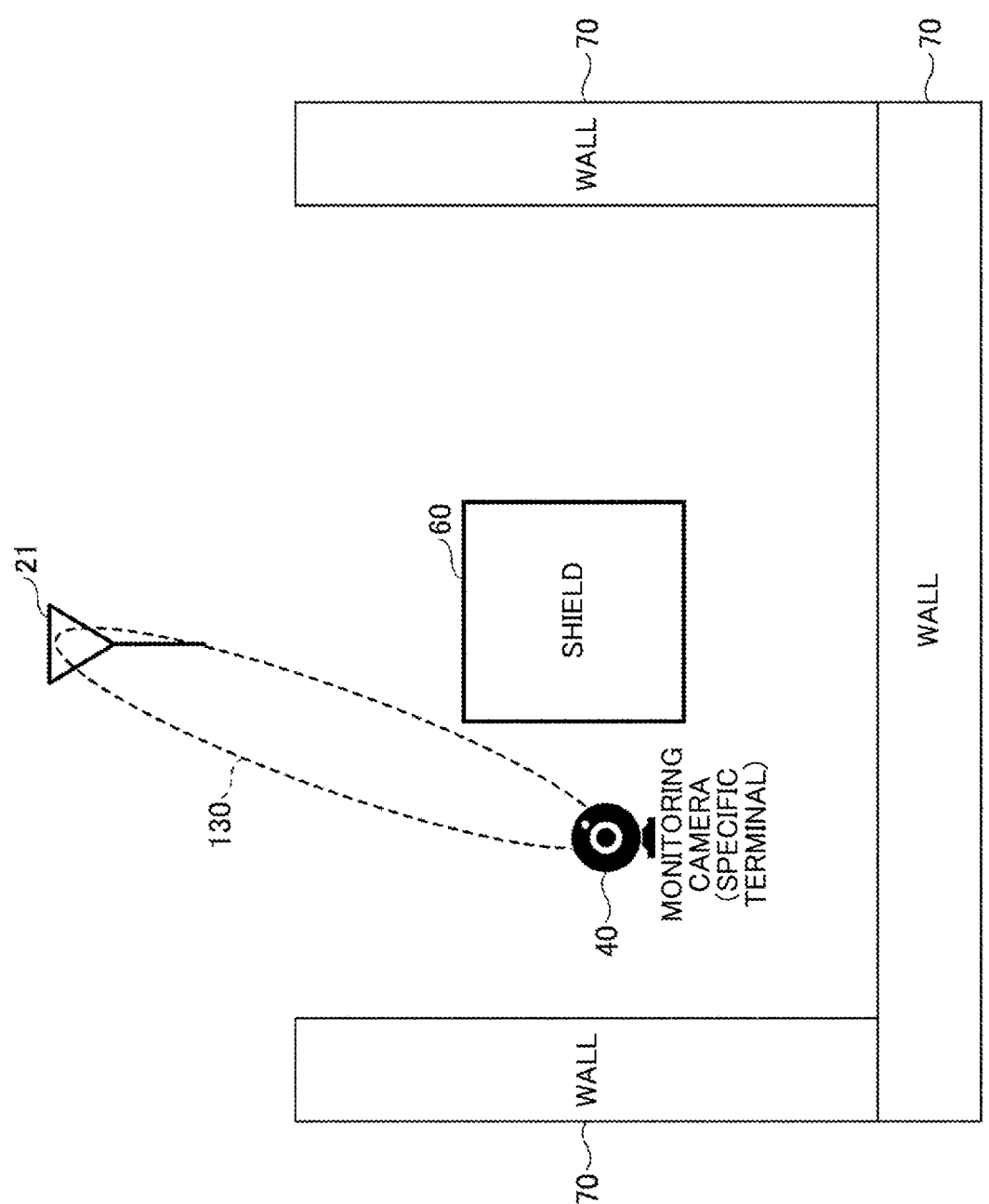
FIG. 8 is a diagram for explaining an example of a method for determining line-of-sight according to the Example 2.

FIG. 8 is a diagram for explaining an example of a method for determining line-of-sight according to the Example 2. In the method for determining line-of-sight according to the present example, the line-of-sight determination unit 14 calculates a Fresnel zone 130 for each monitoring camera 40 (specific terminal) from a point of the center position of the antenna 21 of the base station 20. Then, the line-of-sight determination unit 14 determines that line-of-sight exists for the monitoring camera 40 (specific terminal) in which predetermined X % of the Fresnel zone 130 is not shielded.

According to the method for determining line-of-sight according to the present example, when the position of the monitoring camera 40 (specific terminal) is static to some extent, the area shape, the position and shape of the shield, and the position of the monitoring camera 40 (specific terminal) can be considered.

Similarly to this embodiment, in the calculation processing of the cover area quality Qe in the step S108 of the control processing, the calculation may be performed in consideration of the position information of the terminal 50. Specifically, each terminal 50 transmits the position information via the base station 20, and the control device 10 receives the position information of each terminal 50.

The base station movement control parameter calculating unit 15 of the control device 10 determines whether there is a line-of-sight from the base station 20 to each terminal 50 on the basis of the position information of each terminal 50 in calculation of the cover area quality Qe, and calculates the number of elements in the area. Thus, when each terminal 50 is static to some extent, the cover area quality Qe corresponding to the position of each terminal 50 can be calculated.

(Example of Hardware Configuration According to Present Embodiment)

The control device 10 can be implemented, for example, by causing a computer to execute a program describing the processing details described in the present embodiment. Note that the "computer" may be a physical machine or a virtual machine in the cloud. When using a virtual machine, the "hardware" described here is virtual hardware.

The above program can be stored and distributed by being recorded in a computer-readable recording medium (portable memory or the like). Furthermore, the above program can also be provided through a network such as the Internet or an electronic mail.

Figure 9:
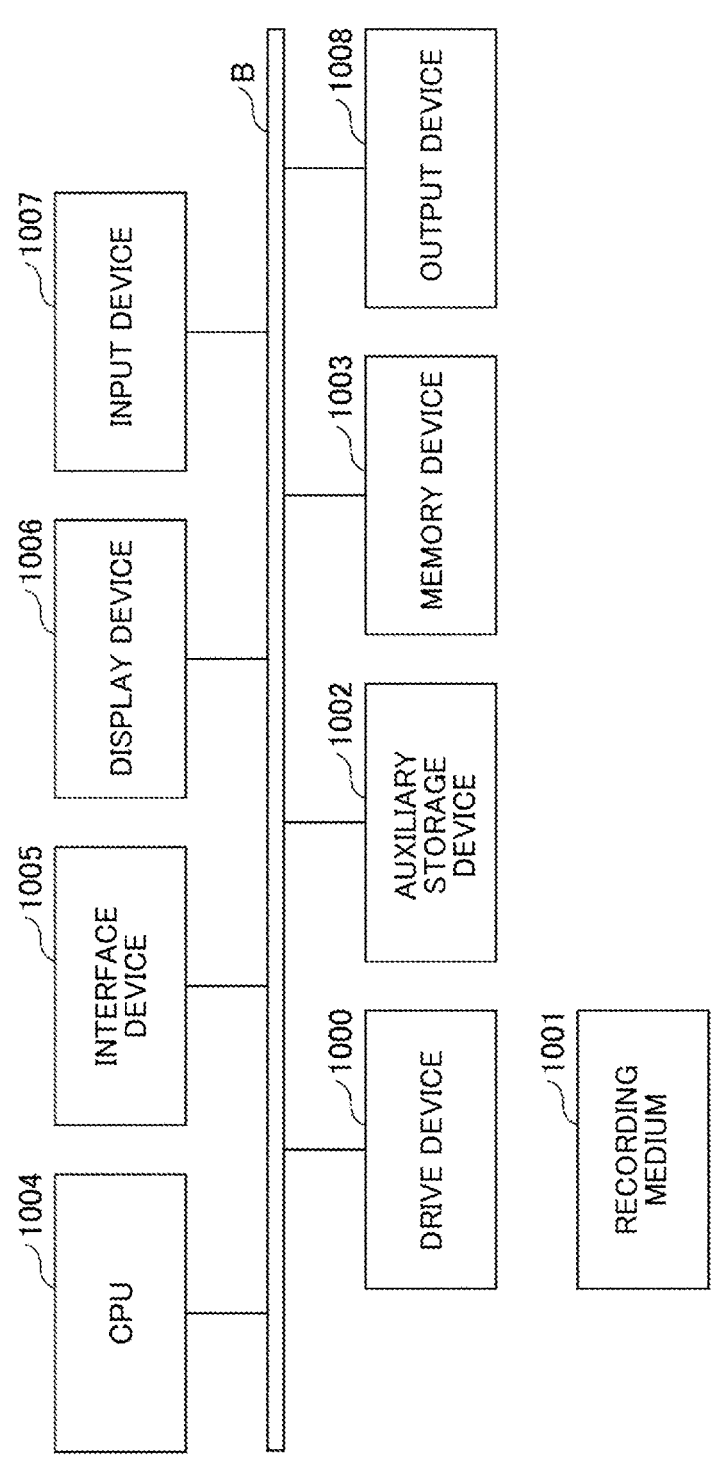
FIG. 9 is a diagram showing a hardware configuration example of a computer.

FIG. 9 is a diagram showing an exemplified hardware configuration of the computer. The computer of FIG. 9 includes a drive device 1000, an auxiliary storage device 1002, a memory device 1003, a CPU 1004, an interface device 1005, a display device 1006, an input device 1007, and an output device 1008 connected to each other via a bus B.

The program implementing processing in the computer is provided from a recording medium 1001 such as a CD-ROM or a memory card, for example. When the recording medium 1001 in which the program is stored is set in the drive device 1000, the program is installed from the recording medium 1001 to the auxiliary storage device 1002 through the drive device 1000. However, the program need not necessarily be installed from the recording medium 1001 and may be downloaded from another computer via a network. The auxiliary storage device 1002 stores the installed program and also stores necessary files, data, and the like.

The memory device 1003 reads and stores the program from the auxiliary storage device 1002 when there is an instruction to start the program. The CPU 1004 implements functions related to the device according to the program stored in the memory device 1003. The interface device 1005 is used as an interface for connection to a network. The display device 1006 displays a graphical user interface (GUI) or the like according to a program. The input device 1007 includes a keyboard and mouse, buttons, a touch panel, or the like, and is used to input various operation instructions. The output device 1008 outputs a calculation result. The computer may include a graphics processing unit (GPU) or tensor processing unit (TPU) instead of the CPU 1004, or may include a GPU or TPU in addition to the CPU 1004. In that case, processing may be divided and executed in such a way that the GPU or the TPU executes processing that requires special arithmetic operations, and that the CPU 1004 executes other processing.

Effects of the Present Embodiment

According to the radio communication device 1 according to the present embodiment, the presence or absence of line-of-sight from each of a plurality of position candidates of a specific terminal is determined on the basis of a shield map based on information obtained by detecting the line-of-sight is detected, and combination for maximizing a monitoring area by the specific terminal and a coverage area quality of the base station is determined, in the position of the base station having the line-of-sight and position of specific terminal. Thus, the position of a specific terminal such as a monitoring camera and a repeater and the position and the direction of the base station can be controlled in conjunction with each other, the proper position of the specific terminal is determined while maximizing the quality of the cover area, Thus, it is possible to efficiently arrange them.

Conclusion of Embodiment

This specification describes at least a control device (control apparatus), a control method, and a program described in the following items.

Item 1

A control apparatus for controlling a position and a direction of a base station, and a position of a specific terminal that wirelessly communicates with the base station in conjunction with each other, the control apparatus including:

a shield detection information acquisition unit which acquires information obtained by detecting the shield;

a specific terminal position candidate calculating unit which calculates a position candidate of the specific terminal on the basis of information obtained by detecting the shield;

a line-of-sight determination unit which determines whether there is line-of-sight of the specific terminal from the base station for each of the position candidates of the specific terminal; and a base station movement control parameter calculating unit which determines a position of the specific terminal on the basis of a result of determination of the presence or absence of the line-of-sight, and calculates a parameter indicating a position and a direction of the base station.

Item 2

In the control apparatus according to item 1,
the specific terminal is a monitoring camera, and
the base station movement control parameter calculating unit calculates a monitoring area of the monitoring camera, and determines the position of the specific terminal to maximize the calculated monitoring area.

Item 3

In the control apparatus according to item 1 or 2, the base station movement control parameter calculating unit calculates a cover area quality of the base station, and calculates the parameter indicating the position and the direction of the base station to maximize the calculated cover area quality.

Item 4

In the control apparatus according to any one of items 1 to 3, the line-of-sight determination unit calculates a Fresnel zone from the base station, and determines that there is line-of-sight for a point in which a predetermined ratio of regions is not blocked among the calculated Fresnel zones.

Item 5

The control apparatus according to any one of items 1 to 4, further including:

a terminal position information acquisition unit which acquires terminal position information indicating a position of the specific terminal, in which the line-of-sight determination unit determines whether there is a line-of-sight in the specific terminal from the base station on the basis of the terminal position information.

Item 6

In the control apparatus according to any one of items 1 to 5, the movement of the base station is controlled on the basis of the calculated parameters indicating the position and the direction of the base station.

Item 7

A control method executed by a control apparatus for controlling a position and a direction of a base station, and a position of a specific terminal that wirelessly communicates with the base station in conjunction with each other.

Item 8

A program for causing a computer to function as each unit of the control apparatus according to any one of items 1 to 6.

Hereinbefore, although the present example has been described, the present invention is not limited to such a specific embodiment, and can be modified and changed variously without departing from the scope of the invention described in the appended claims.

REFERENCE SIGNS LIST

1 Radio communication device
10 Control device
11 Shield detection information acquisition unit
12 Shield map generation unit
13 Specific terminal position candidate calculating unit
14 Line-of-sight determination unit
15 Base station movement control parameter calculating unit
16 Terminal position information acquisition unit
20 Base station
21 Base station movement mechanism
22 Radio transmission and reception unit
23 Signal demodulating unit
30 Shield detector
40 Monitoring camera
41 Radio transmission and reception unit
42 Position information acquisition unit
43 Shield detection unit
50 Terminal
60 Shield
70 Wall
100 Feature point variation data
1000 Drive device
1001 Recording medium
1002 Auxiliary storage device

11

1003 Memory device
1004 CPU
1005 Interface device
1006 Display device
1007 Input device
1008 Output device

The invention claimed is:

1. A control apparatus for controlling a position and a direction of a base station and a position of a specific terminal that wirelessly communicates with the base station in conjunction with each other, the control apparatus comprising:

a processor; and a memory that includes instructions, which when executed, cause the processor to execute:

acquiring information obtained by detecting a shield;

calculating a position candidate of the specific terminal based on information obtained by detecting the shield;

determining whether there is line-of-sight of the specific terminal from the base station for each of the position candidates of the specific terminal;

determining a position of the specific terminal based on a result of determination of presence or absence of the line-of-sight;

setting a range of values in advance for a first parameter indicating a position of the base station and for a second parameter indicating a direction of the base station; and selecting one of a plurality of combinations of the values for the first parameter and the second parameter within the range, as a parameter indicating the position and the direction of the base station.

2. The control apparatus according to claim 1, wherein the specific terminal is a monitoring camera, and the processor is further caused to execute:

calculating a size of a monitoring area of the monitoring camera; and determining the position of the specific terminal to maximize the calculated size of the monitoring area.

3. The control apparatus according to claim 1, wherein the processor is further caused to execute:

calculating a cover area quality of the base station; and selecting the parameter indicating the position and the direction of the base station to maximize the calculated cover area quality.

4. The control apparatus according to claim 1, wherein the determining of the line-of-sight includes calculating a Fresnel zone from the base station, and determining that there is line-of-sight for a point in which a predetermined ratio of regions is not blocked among the calculated Fresnel zones.

5. The control apparatus according to claim 1, wherein the processor is further caused to execute:

acquiring terminal position information indicating a position of the specific terminal, wherein the determining of the line-of-sight includes determining whether there is a line-of-sight in the specific terminal from the base station based on the terminal position information.

6. The control apparatus according to claim 1, wherein the processor is further caused to execute controlling a movement of the base station based on the calculated parameter indicating the position and the direction of the base station.

7. A non-transitory computer-readable recording medium having computer-readable instructions stored thereon, which when executed, cause a computer including a memory and a processor to execute the acquiring, the calculating, the determining, the setting, and the selecting of the control apparatus according to claim 1.

8. A control method executed by a computer in a control apparatus for controlling a position and a direction of a base station, and a position of a specific terminal that wirelessly communicates with the base station in conjunction with each other, the control method comprising:

acquiring information obtained by detecting a shield;

calculating a position candidate of the specific terminal based on information obtained by detecting the shield;

determining whether there is line-of-sight of the specific terminal from the base station for each of the position candidates of the specific terminal;

determining a position of the specific terminal based on a result of determination of presence or absence of the line-of-sight;

setting a range of values in advance for a first parameter indicating a position of the base station and for a second parameter indicating a direction of the base station; and selecting one of a plurality of combinations of the values for the first parameter and the second parameter within the range, as a parameter indicating the position and the direction of the base station.

9. A control apparatus for controlling a position and a direction of a base station and a position of a specific terminal that wirelessly communicates with the base station in conjunction with each other, the control apparatus comprising:

a processor; and a memory that includes instructions, which when executed, cause the processor to execute:

acquiring information obtained by detecting a shield;

calculating a position candidate of the specific terminal based on information obtained by detecting the shield;

determining whether there is line-of-sight of the specific terminal from the base station for each of the position candidates of the specific terminal; and determining a position of the specific terminal based on a result of determination of presence or absence of the line-of-sight, and calculating a parameter indicating a position and a direction of the base station, wherein the specific terminal is a monitoring camera, and the calculating of the parameter includes calculating a size of a monitoring area of the monitoring camera, and determining the position of the specific terminal to maximize the calculated size of the monitoring area.

* * * * *